United States Patent [19]
Arroyo et al.

[11] Patent Number: 5,131,064
[45] Date of Patent: Jul. 14, 1992

[54] CABLE HAVING LIGHTNING PROTECTIVE SHEATH SYSTEM

[75] Inventors: Candido J. Arroyo, Lithonia; Nathan E. Hardwick, III, Dunwoody; Michael D. Kinard; Wing S. Liu, both of Lawrenceville; Parbhubhai D. Patel, Dunwoody; Walter J. Paucke, Tucker; Phillip M. Thomas, Suwanee, all of Ga.

[73] Assignee: AT&T Bell Laboratories, Murray Hill, N.J.

[21] Appl. No.: 657,696

[22] Filed: Feb. 19, 1991

[51] Int. Cl.⁵ .............................................. G02B 6/44
[52] U.S. Cl. ................................. 385/102; 385/107; 385/113; 174/20
[58] Field of Search ................... 350/96.23; 385/102, 385/107, 106, 113, 114; 174/20, 106 D

[56] References Cited

U.S. PATENT DOCUMENTS

| | | | |
|---|---|---|---|
| 4,557,560 | 12/1985 | Bohannon, Jr. et al. | 350/96.23 |
| 4,781,433 | 11/1988 | Arroyo et al. | 350/96.23 |
| 4,818,060 | 4/1989 | Arroyo | 350/96.23 |
| 4,836,640 | 6/1989 | Gartside, III et al. | 350/96.23 |
| 4,867,526 | 9/1989 | Arroyo et al. | 350/96.23 |
| 4,874,219 | 10/1989 | Arroyo et al. | 350/96.23 |
| 4,946,237 | 8/1990 | Arroyo et al. | 350/96.23 |
| 4,971,419 | 11/1990 | Gartside et al. | 350/96.23 |
| 5,013,127 | 7/1991 | Bernard | 350/96.23 |

Primary Examiner—Akm E. Ullah
Assistant Examiner—Phan T. Heartney
Attorney, Agent, or Firm—Edward W. Somers

[57] ABSTRACT

A communications cable for use in buried environments in an outside plant includes a core (22) comprising at least one transmission medium and a mechanically strengthened, thermal resistant barrier layer (40) disposed about a plastic tubular member (23). A metallic shield (32) and a plastic jacket (36) are disposed about the barrier. The barrier layer may comprise a tape (41) which is made of a material such as woven glass or an aramid fibrous material, for example, which is resistant to relatively high temperatures, which has suitable strength properties in all directions and at elevated temperatures and which is characterized by properties which cause the barrier layer to impede the passage therethrough of particles which are sufficiently large to cause damage to the core. In a preferred embodiment, the thermal barrier layer also includes provisions for preventing the longitudinal flow of water within the cable. Such a waterblocking capability may be provided by a barrier layer comprising a laminate comprising a high temperature resistant tape and at least one other tape with a superabsorbent powder therebetween or another tape which has been impregnated with a superabsorbent material.

22 Claims, 2 Drawing Sheets

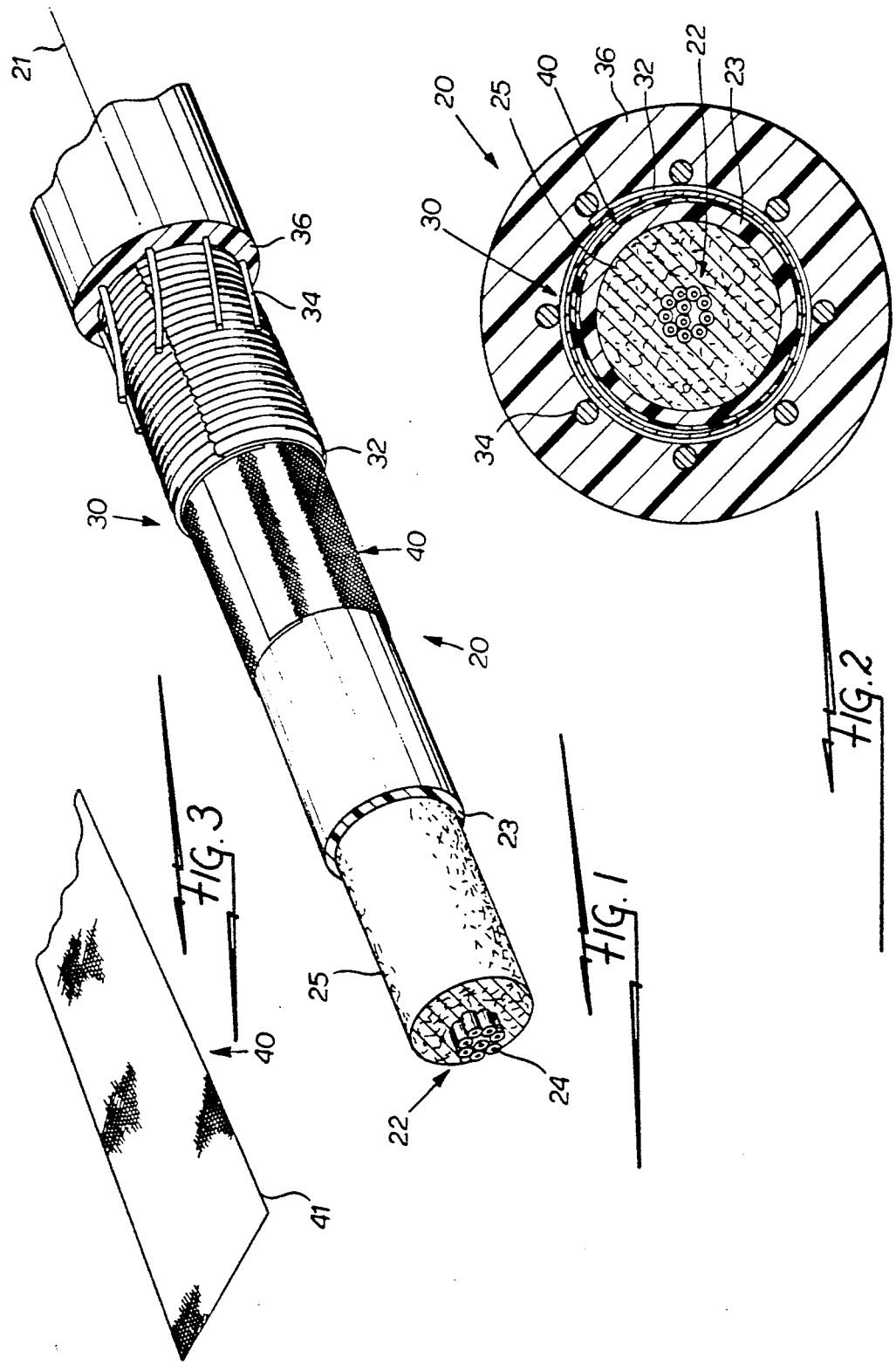

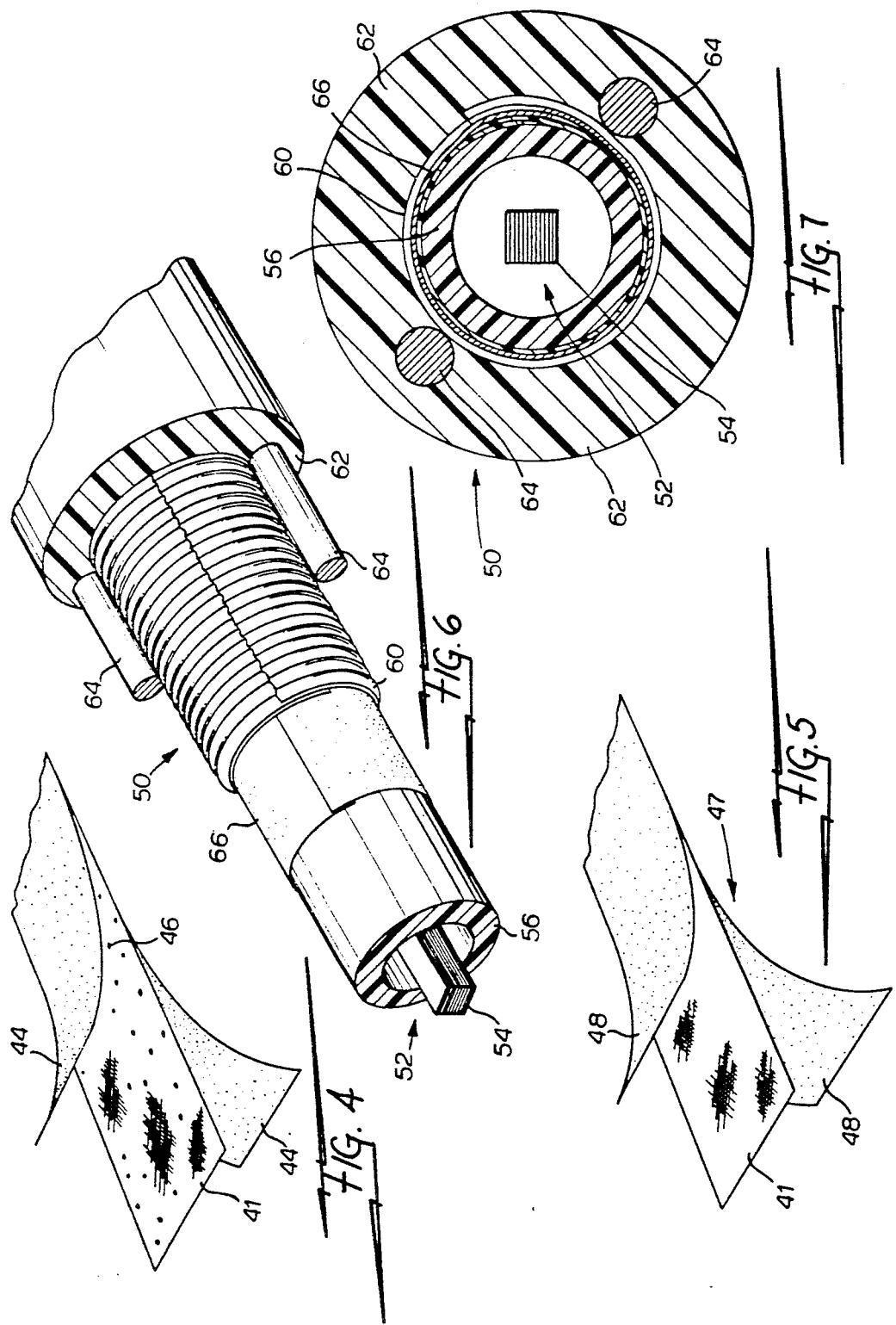

CABLE HAVING LIGHTNING PROTECTIVE SHEATH SYSTEM

TECHNICAL FIELD

This invention relates to a cable having a lightning protective sheath system. More particularly, the invention relates to a cable which includes a lightning protective sheath system comprising a barrier layer which is disposed between a core of the cable and a metallic shield thereof and which may include waterblocking provisions.

BACKGROUND OF THE INVENTION

Communications cables for outside plant typically include a core comprising transmission media disposed within a polymeric tubular member called a core tube and an enclosing sheath system. The transmission media may comprise copper conductors or optical fiber. Also typically, the sheath system includes provisions for mechanical and rodent protection, such as, for example, a metallic shield, and an overlying plastic jacket. It is well known that buried and aerial cables also are damaged by lightning strikes. Accordingly, cables desirably also should include provisions which protect the transmission media portion of the cable from lightning strikes, as well as from the aforementioned mechanical and rodent damage.

A lightning strike begins as a so-called "step leader" which moves at a fraction of the speed of light in approximately fifty meter steps from clouds to earth. The step leader is not visible to the naked eye, but it results in a jagged channel to ground, the channel being full of negative charge. When the step leader reaches the ground, the negative charge is released to earth by a return strike which is the bright, noisy part of the lightning flash to ground. Subsequent strokes may occur along the same channel within tens of milliseconds of each other.

The impedance of the strike channel is considerably higher than the impedance of objects, such as telephone plant, which may become part of the strike's path. Thus, the lightning strike may be considered as a current source. The waveshapes of lightning strike currents vary, but a large number of observations has facilitated the statistical distribution of the peak current of first and subsequent return lightning strikes. Smaller lightning strikes of less than 10 kA do not arc to buried structures. Typically, 90% of first return strikes have a peak current in excess of 6.2 kA whereas only 5% have a peak current in excess of 100 kA. See p. 33 of *Lightning Protection of Aircraft* published in 1990 by Lightning Technologies, Inc. and authored by F. A. Fisher, J. A. Plumer, and R. A. Perala.

Damage to the transmission media caused by a lightning strike may occur in either or both of two ways. Thermal damage, that is burning, charring and melting of components of the sheath system, is caused by the heating effects of the lightning strike and a current being carried to ground by metallic members of the core or sheath system. When lightning strikes a metallic shield, for example, the metallic shield will be subjected to ohmic heating and, if it cannot carry the current, will vaporize. This will cause any adjacent elements such as a polymeric core tube to soften or melt, thereby possibly exposing the optical fibers therein to heat and damage therefrom. In buried cables, a second mode of damage is mechanical in nature, causing crushing, localized distortion of the sheath system and large scale lateral mechanical deformations of the cable. This results from an explosive impact, sometimes called a steamhammer effect, which is caused by the instantaneous vaporization of water in the earth in a lightning channel to the cable or other effects which have not yet been explained. In addition to the crushing effect, this explosive phenomena can cause a puncture of the shield, as well as cause molten metal particles from the shield or other metallic elements of the cable to be driven into the core tube, causing damage to elements of the core. In some instances, the thermal damage mechanism may dominate whereas in others, protection from mechanical damage mechanisms may be the key to preventing detrimental lightning effects on the cables.

In order to simulate the effects of lightning strikes on buried optical fiber cables, a lightning test has been developed. The test, which is performed inside a rigid wooden box which is filled with a wet sand to simulate field conditions, provides for electrical impulse testing of optical fiber cables with specified current waveforms and peak current levels. The purpose of the test is to simulate the effects of a lightning arc at a point where it attaches to a cable and to establish the relative susceptibility of optical fiber cable to damage from such arcing. This test is referred to as FOTP-181, *Lightning Damage Susceptibility Test For Fiber Optic Cables With Metallic Components* and, when published, will become part of a series of test procedures included within Recommended Standard ANSI/EIA/TIA-455-A. To pass a commonly specified test, a cable sample shall not sustain damage that affects the transmission of light when the peak value of the current pulse is in a predetermined range.

After removing a cable sample from the test box, the continuity of all the optical fibers is determined. This measurement is performed by directing a high intensity light at one end of the fiber, and observing light continuity at the other end, by physical examination, or by any other optical means. Typically, any fiber discontinuity constitutes failure.

The prior art abounds with patents relating to copper core cables having a sheath system which includes provisions intended to provide lightning protection. Such a sheath system may be one comprising an aluminum shield enclosed by a carbon steel shield with each having a longitudinal seam. Such a sheath system is intended to provide protection from mechanical damage, electromagnetic interference and lightning.

Lately, optical fiber cables have made inroads into the communications cable market. Although metallic conductors generally are not used for transmission in lightguide fiber cables, metallic members are commonly used in the sheath system, for example. Consequently, some form of lightning protection is needed for optical fiber cables which include metallic members. Lightning protection is perhaps even more critical for an optical fiber cable which includes metallic members due to its relatively high capacity and the fragility of the glass fibers. Also, optical fiber cable is exposed to typical mechanical hazards such as abrasion and crushing, for example, during installation. Any element or system which is included in the cable to provide lightning protection also must be able to withstand the mechanical abuse to which it may be subjected as a result of a lightning strike.

In a somewhat recently introduced lightning protection system, a sheath system which encloses a core comprising at least one conductor such as an optical fiber, for example, and a core tube includes an inner metallic shield which has a relatively high thermal capacity and a relatively low resistivity. An outer corrugated shield encloses the inner metallic shield and has a longitudinal seam. The outer shield is a laminate which comprises a corrosion-resistant metallic material having a relatively high elongation. The outer shield is bonded to a jacket which comprises a plastic material. The corrosion-resistant metallic material has sufficient thickness, elongation and tensile strength to cause the bonded composite comprising the jacket and the outer shield to provide the cable with enhanced lightning impact resistance. However, it is desired to provide still further protection with fewer manufacturing operations for the underlying polymeric core tube.

One solution which requires fewer operations is to increase the thickness of the core tube or to include multiple layered plastic tubular members in the cable structure. However, such solutions require more plastic material and/or its manufacture is difficult to control. Another solution is to use relatively high modulus materials for the core tube, but such materials usually are prohibitive in cost and exhibit hydrolytic stability problems.

Seemingly, the prior art is devoid of an economical sheath system which provides suitable protection against lightning, as well as against mechanical hazards, particularly for small size cables such as might be used in outside plant for optical fiber communications. What is desired is a cable structure which resists degradation by lightning strikes. Of course, any solution cable should be one which does not detract from other desired characteristics of the cable sheath such as small size, low cost and waterblocking capability.

SUMMARY OF THE INVENTION

The forgoing problems of the prior art have been overcome with cables of this invention. A communications cable which is suitable for use in a buried environment and which has suitable protection from lightning, includes a core comprising at least one transmission medium, and, typically, a tubular longitudinally extending plastic member which is referred to commonly as a core tube and within which is disposed the core. A metallic shield is wrapped longitudinally or helically about the core and a plastic jacket is disposed about the shield. A barrier layer which may include a tape is disposed between the metallic shield and the core and usually is wrapped longitudinally or helically about the tubular member. The barrier layer comprises a high temperature resistant material. Not only is the barrier layer characterized by a relatively high temperature resistance but also by mechanical properties which prevent the underlying core tube from bending or deforming excessively when a lightning strike occurs and, additionally, which impede the passage of particles of the shield or of other metallic members of the cable.

In a preferred embodiment, the barrier layer not only provides enhanced lightning protection for the cable, but also, it provides a waterblocking capability for the cable. The dual function of lightning protection and water blocking is provided by a laminate comprising the suitably high temperature resistant tape and another tape with a superabsorbent powder disposed therebetween. In an alternative embodiment, a spunbonded nonwoven tape which has been impregnated with a superabsorbent material is laminated to a high temperature resistant tape such as a woven glass tape, for example. In another alternative embodiment, a barrier tape characterized by the aforementioned thermal and mechanical properties is itself impregnated with a superabsorbent material.

Every cable struck by lightning does not necessarily incur all the forms of damage discussed hereinabove. The type of damage to which the core is subjected depends upon factors such as shield material, sheath system design, core tube material and size, peak current and time-to-half value of a lightning strike, and the moisture content of a surrounding medium, for example. However, the barrier layer of this invention protects the cable core against all the mechanical and thermal damage mechanisms which the cable is expected to encounter based on any realistic combination of the factors listed hereinabove. In some cases, the thermal damage mechanism may dominate, whereas in others, protection from the mechanical damage mechanism may be the key to preventing detrimental lightning effects on the communication cable.

The combined features of a lightning barrier and water blocking in a single tape results in a cable having a sheath system with these two characteristics which is easier to manufacture, more economical and smaller in size than those of the prior art.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of an optical fiber cable which includes a barrier layer of this invention;

FIG. 2 is an end sectional view of the cable of FIG. 1;

FIG. 3 is a perspective view of a barrier layer which includes waterblocking provisions;

FIGS. 4 and 5 are perspective views of alternate barrier layers of cables of this invention;

FIG. 6 is a perspective view of another cable of this invention; and

FIG. 7 is an end sectional view of the cable of FIG. 6.

DETAILED DESCRIPTION

Referring now to FIGS. 1 and 2, there is shown a communications cable which is designated generally by the numeral 20. It has a longitudinal axis 21 and includes a core 22 being disposed within a tubular plastic member 23, which often is referred to as a core tube, and comprising one or more optical fibers 24-24. The tubular member 23 is filled with a filling compound 25 such as that disclosed in U.S. Pat. No. 4,701,016 issued on Oct. 20, 1987, in the names of C. H. Gartside III, et al.

The cable 20 also includes a sheath system which is designated generally by the numeral 30. The sheath system includes a corrugated metallic shield system 32 and one or more strength members 34-34 and an outer plastic jacket 36. The shield system may be bonded to the jacket 36. Such a cable is disclosed and claimed in commonly assigned U.S. Pat. No. 4,765,712 which issued on Aug. 23, 1988 in the names of W. D. Bohannon, Jr., et al., now U.S. Pat. No. Re. 33,459, the reissued date of the patent being Nov. 27, 1990.

Disposed between the metallic shield 32 and the tubular member 23 is a longitudinally extending barrier layer designated generally by the numeral 40. In a preferred embodiment, the barrier layer 40 includes a tape 41 (see FIG. 3) which is effective to provide lightning protection for the cable core 23.

The tape 41 is an effective thermal barrier to provide a delay in the thermal heat transfer radially into the core of the cable 20. Not only does the tape 41 function as a heat barrier, but also it functions as a mechanical barrier to reduce the fiber core damage which is caused by the hereinbefore described steamhammer effect. The tape also results in a sheath system having an increased tensile stiffness that further reduces the fiber core damage by resisting the tendency for a blast to bend suddenly the cable in the vicinity of the lightning strike.

The tape 41 is characterized by a relatively low thermal conductivity and corresponding low thermal diffusivity so as to resist the transfer of heat energy generated by a lightning strike to the metallic shield 32 should it not be able to diffuse rapidly the current generated by a lightning strike. Typical of the thermal conductivity values of the barrier 40 are those in the range of about 0.0001 to 0.005 cal.cm/cm²·sec°C.

The tape 41 must be characterized not only by a sufficiently high thermal resistance but also by mechanical properties which prevent the core tube from fracturing or becoming deformed sufficiently to damage the core components and which impedes the passage therethrough of particles of the shield or other metallic components of the sheath system which are propelled into engagement with the barrier layer 40 by the lightning strike. Hence, the tape 41 must be sufficiently dense so that there is substantially no passage therethrough of particles of sufficient size which could cause detrimental damage to components of the core 22. Such a characteristic may be achieved with a relatively high strength, thermal resistant tape that is continuous, woven or stranded. In any one of the aforementioned, any passages through a continuous type structure or between adjacent strands or fibers should be sufficiently small to impede particles of the shield or any other metallic components of the shield from being propelled through the barrier layer and the core tube and into engagement with optical fibers in the core. For some materials of which the tape may be made, this attribute of the barrier may be characterized by a surrogate parameter, its air permeability. Air permeability of a material is defined as the rate of air flow through the material under a given differential pressure. See ANSI/ASTM D 737-75.

The tape 41 also must be characterized to have a relatively high softening temperature so that it will not loose its mechanical strength during the initial temperature rise accompanying a lightning strike. Also, it must have an electrical resistivity which is sufficiently high so that the barrier will not attract a lightning strike directly to the barrier layer. Further, the longitudinal tensile stiffness of the tape also must be sufficiently large to prevent the core tube from being bent so much that it ruptures or deforms excessively and must have acceptable strength in all directions at relatively high temperatures such as those expected to be experienced by the barrier during a lightning strike.

The tape 41 may be comprised of a woven glass material. Also, it has been found that a material which is an inorganic cellular material such as an aramid fiber is suitable for the tape 41. Further, it may be comprised of carbon fibers. In other embodiments, the tape 41 may comprise a coated, relatively high strength polymeric material such as KEVLAR ® material which may be woven or stranded or a needle-punched relatively high strength thermal resistant such as KEVLAR ® material or other suitable polymeric material. What is important is the thermal heat resistivity of the tape 41 in combination with its mechanical resistance at elevated temperatures.

For the preferred embodiment, these requirements are met by a tape 41 which is made of a woven glass. Woven glass is a textile of glass yarns which have been weaved into place. Woven glass suitable for use as the thermal barrier herein has a thermal conductivity of about 0.0001 cal.cm/cm²·sec.°C. (thermal diffusivity of about 0.004 cm²/sec), a softening temperature greater than about 700° C. and an electrical resistivity in the range of about $10^{15}$ to $10^{16}$ ohm-cm. The barrier glass tape 41 of the preferred embodiment is characterized by an air permeability of 0.20 to 0.36 m³/m²·sec. at 124 Pa. which is sufficient to prevent the passage therethrough of particles sufficient in size to damage the core tube and/or optical fibers. The tape 41 typically is wrapped about the core tube to form a longitudinal overlapped seam. Also, the tape of the preferred embodiment has a thickness of about 0.017 cm.

Furthermore, for the preferred embodiment, the fibers comprising the tape structure are characterized to have a softening temperature greater than about 700° C. and a tensile strength at room temperature of about at least 1.4 GPa. The completed glass tape structure will typically exhibit a longitudinal break strength of at least 420 Newtons/cm of width and a transverse break strength of at least 350 Newtons/cm of width.

In another embodiment, the barrier layer 40 may comprise a plurality of strands of material such as those described hereinbefore which are held together on a tape that is wrapped about the core tube. Such strands must be characterized by thermal and mechanical properties as set out hereinbefore and must be arranged such that they provide a barrier to the passage therethrough toward the core of particles which are sufficient in size to cause damage to optical fibers in the core.

In the preferred embodiment, the cable 20 also must include provisions for blocking the flow of water longitudinally along the cable. Of course, as mentioned hereinbefore, the core may be filled with a grease-like material. As is well known, a filling material alone in the core may not be sufficient protection for the cable. The sheath system desirably includes provisions for blocking the longitudinal flow of water. See U.S. Pat. No. 4,815,813 which issued on Mar. 28, 1989 in the names of C. J. Arroyo, et al.

Advantageously, in the cable 20, the barrier layer 40 is such that it not only provides lightning protection, but also waterblocking capability for the sheath system. In the preferred embodiment of the barrier layer which is shown in FIG. 4, the longitudinally extending barrier 40 comprises a woven glass tape 41 which is laminated between two tapes 44—44. Disposed between each of the tapes 44—44 and the center tape 41 is a superabsorbent material such as a superabsorbent powder 46. The overall thickness of the laminate is about 0.036 cm. A superabsorbent powder which is suitable for the barrier layer 40 is well known in the art. The air permeability of such a barrier layer is in the range of about 0.06 to 0.08 m³/m²·sec. at 124 Pa.

In the preferred embodiment, each tape 44 comprises a spunbonded non-woven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material, which is substantially nonhygroscopic, and which has the capability of maintaining its shape in the presence of the temperatures encountered during the extrusion of the jacket 36. The fibers of the web structure are arranged so that air cells or pockets are formed.

A polyethylene terephthalate fiber product, formed into a web structure as described above has been identified under the registered trademark "Reemay" by the E. I. Du Pont de Nemours and Company, Incorporated of Wilmington, Del. Presently, the Reemay ® web structure is available in various thicknesses and densities from Reemay, Inc. of Old Hickory, Tenn. The properties of Reemay tapes are further defined and described in Bulletin R-1, dated Mar. 1986, entitled "Properties and Processing of Reemay ® Spunbonded Polyester" from E. I. du Pont de Nemours and Company, Incorporated, Wilmington, Del.

In the alternative, the barrier layer may comprise a laminate 47 (see FIG. 5) which includes a center, thermally resistant tape 41 and two tapes 48—48, each of which comprises a carrier tape made of a material such as Reemay web structure which has been treated such as by impregnation with a superabsorbent material. Such an impregnated tape is disclosed in U.S. Pat. No. 4,867,526 which issued on Sept. 19, 1989 in the name of C. J. Arroyo.

In still another alternative, the barrier layer 40 which comprises a tape 41 having the requisite thermal conductivity, mechanical strength and barrier characteristics is provided with a coating of a superabsorbent material on each of its two major surfaces. For such an arrangement, the coated layer of superabsorbent material may have a thickness of about 0.003 cm on each major surface of a tape 40 which has a thickness in the range of about 0.018 to 0.023 cm.

Superabsorbent materials which are used in cables of this invention are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. One of the early superabsorbents was a saponified starch graft polyacrylonitrile copolymer. See U.S. Pat. No. 3,425,971. The above-identified patent discloses saponifying starch-graft polyacrylonitrile copolymers with aqueous bases. Also see U.S. Pat. Nos. 4,090,998, 4,172,066 and 4,511,477.

Two major superabsorbents which are available today are cellulosic or starch-graft copolymers and synthetic superabsorbents, major broad classes of synthetic superabsorbents, polyelectrolytes and the nonelectrolytes. The polyelectrolytes are the most important and fall generally into four classes-polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are the most common.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. The absorbency of the product is determined by the number of ionizable groups, usually carboxylates, and the cross-linking density.

The cross-linking density affects not only the absorbency, but also the time it takes to absorb and the strength of the gel formed. Generally, the higher the cross-linking density, the stronger is the gel which is formed. The time to reach absorbent capacity decreases as the cross-linking density increases, and the absorbent capacity decreases.

Also, each tape 48 may be impregnated or the tape 40 may be coated with any of several water blocking superabsorbent materials. In one embodiment, it is impregnated with a superabsorbent material which is derived from an aqueous solution comprising acrylate polymeric material which combines acrylic acid and sodium acrylate functionalities and water. The impregnating material of the one embodiment comprises a sodium salt of polyacrylic acid in which all the carboxylic groups may or may not be reacted with sodium. After a tape 48 has been impregnated, the superabsorbent material is dried to provide a film on the tape. It is desirable to impregnate the tape 48 with a film of the impregnating material instead of a powder.

In another embodiment, a Reemay spunbonded polyester tape may be impregnated with an aqueous solution comprising acrylates and acrylamide polymer powders mixed with water to provide a tape 48. The tape 48 impregnated with such a composition has a density which may represent an increase as high as about 80% of the density of the untreated tape. In each of the embodiments just described, the impregnating material is a mixture of water and a superabsorbent material in which the mixture comprises about 4 to 7% solids when the impregnating material is an aqueous solution and applied.

In general, the tape 48 may be impregnated with (1) a material comprising polyacrylic acid, (2) a material comprising polyacrylamide (3) blends of (1) and (2) or salts thereof or (4) copolymers of acrylic acid and acrylamides and salts thereof as well as other similar materials.

It is believed that the combination of a thermal barrier tape laminated to waterblocking tapes provides a synergistic effect with respect to lightning protection for the cable 20. Because the laminate is bulkier than the thermal barrier tape 41 alone, it provides an enhanced buffer to isolate the optical fibers within the core from mechanical deformation caused by the steamhammer effect.

What is provided is a cable having a member which is characterized as an enhancement to lightning protection as well as providing waterblocking capability for the cable. One longitudinally extending member which may be applied on one pass of the tubed cable core on a manufacturing line provides both enhancements. As a result, cable diameter is not unduly increased and costs are controlled.

Also important is the tensile strength of the thermal barrier layer. For the preferred embodiment woven glass laminated with two spunbonded polyester tapes 44—44 with superabsorbent powder therebetween, the breaking strength has been found to be an acceptable 350 Newtons/cm of width.

It has been found that the above-described cable 20 passes industry tests for both lightning and for waterblocking. For example, samples of the cable 20 passed the highest level of industry acceptable criteria.

Another cable of this invention is one depicted in FIGS. 6 and 7 and which is designated generally by the numeral 50. The cable 50 includes a core 52 which may comprise one or more units (not shown) of optical fiber or a stack of optical fiber ribbons 54—54 disposed within a plastic tubular member 56. A metallic shield 60 and a plastic jacket 62 enclose the tubular member 56. A strength system includes two longitudinally extending strength members 64—64.

Enhanced lightning protection for the cable 50 is provided by a longitudinally wrapped barrier layer 66. The barrier layer 66 is characterized by the properties of the barrier layer 40 and may be a laminate as described hereinbefore or itself may be impregnated with a superabsorbent material.

It is to be understood that the above-described arrangements are simply illustrative of the invention. Other arrangements may be devised by those skilled in the art which will embody the principles of the invention and fall within the spirit and scope thereof.

We claim:

1. A communications cable which has suitable protection from lightning, said cable including:
   a core comprising at least one transmission medium;
   a plastic jacket which is disposed about said core;
   a metallic shield which is disposed about said core and interposed between said core and said jacket; and
   a barrier layer which includes a tape and which is disposed about said core and interposed between said core and said metallic shield, said barrier layer comprising a high temperature resistant material which is characterized by a thermal conductivity in the range of about 0.0001 to 0.005 cal·cm/cm$^2$·sec°C. and which inhibits substantially the flow therethrough of particles which are sufficient in size to damage said core.

2. The cable of claim 1, wherein said barrier layer comprises strands of material each having a tensile strength on the order of at least about 1.4 GPa.

3. The cable of claim 1, wherein said barrier layer includes a tape which is wrapped longitudinally about said core.

4. The cable of claim 3, wherein said tape of said barrier layer is characterized by an air permeability of about 0.20 to 0.36 m$^3$/m$^2$·sec at 124 Pa.

5. The cable of claim 1, wherein said tape comprises a woven glass material.

6. The cable of claim 1, wherein said tape comprises an aramid material.

7. The cable of claim 1, wherein said tape of said barrier layer is characterized by a softening temperature in excess of 700° C., a longitudinal breaking strength of at least about 420 Newtons per cm of width and a transverse breaking strength of at least about 350 Newtons per cm of width and wherein said tape is comprised of strands of material each having a tensile strength in the order of at least about 1.4 GPa.

8. The cable of claim 1, wherein said cable also includes a longitudinally extending tubular member in which is disposed said core.

9. The cable of claim 1, wherein said barrier layer also includes provisions for providing a waterblocking capability.

10. The cable of claim 9, wherein said barrier layer comprises a laminate comprising a woven glass tape and a spun bonded non-woven polyester material having a superabsorbent powder disposed therebetween.

11. The cable of claim 9, wherein said barrier layer comprises a tape which is impregnated with a superabsorbent material.

12. The cable of claim 9, wherein said barrier layer includes a laminate comprising a relatively high temperature thermally resistant tape and a relatively porous tape which has been impregnated with a superabsorbent material.

13. The cable of claim 11, wherein said tape comprises a spunbonded polyester material including continuous filament polyester fibers that are randomly arranged, highly dispersed and bonded at filament junctions.

14. The cable of claim 12, wherein said superabsorbent material comprises a fiber which includes an acrylate polymer which includes acrylic acid and sodium acrylate.

15. A barrier having waterblocking and thermal resistance capability, said barrier comprising:
    a member which comprises a relatively high temperature resistant material, which is characterized by a thermal conductivity in the range of about 0.0001 to 0.0005 cal cm/cm$^2$sec$^2$° C. which inhibits substantially the passage therethrough of particles which are sufficiently large to cause damage to optical fibers covered by said barrier, and which has a softening temperature of about 700° C. and an electrical resistivity in the range of about 10$^{15}$–10$^{16}$ ohm-cm; and
    waterblocking means associated with said member.

16. The barrier of claim 15, wherein said member comprises a woven glass material.

17. The barrier of claim 15, wherein said member comprises an aramid material.

18. The barrier of claim 15, wherein said barrier is characterized by a softening temperature in excess of 700° C., a longitudinal breaking strength of at least about 420 Newtons per cm of width and a transverse breaking strength of at least about 350 Newtons per cm of width and wherein said member comprises strands of material each having a tensile strength at least about 1.4 GPa.

19. The barrier of claim 15, which comprises a laminate comprising a woven glass tape and a spunbonded non-woven polyester material having a superabsorbent powder disposed therebetween.

20. The barrier of claim 15, said member comprising a tape which is impregnated with a superabsorbent material.

21. The barrier of claim 20, wherein said tape comprises a spunbonded polyester material including continuous filament polyester fibers that are randomly arranged, highly dispersed and bonded at filament junctions.

22. The barrier of claim 20, wherein said superabsorbent material comprises a fiber which includes an acrylate polymer which includes acrylic acid and sodium acrylate.

* * * * *